United States Patent [19]

Lowe, Jr.

[11] 4,402,672
[45] Sep. 6, 1983

[54] METHOD FOR PLOTTING AND DISSEMINATING INFORMATION ON THE PATHS OF VIOLENT STORMS

[76] Inventor: Henry E. Lowe, Jr., 21725 Allegheny St., Cassopolis, Mich. 49031

[21] Appl. No.: 320,303

[22] Filed: Nov. 12, 1981

[51] Int. Cl.³ .................. G09B 19/00; G09B 29/00
[52] U.S. Cl. .................................. 434/217; 434/153; 283/34
[58] Field of Search .............. 434/217, 150, 153; 283/34, 35

[56] References Cited

U.S. PATENT DOCUMENTS

| | | | |
|---|---|---|---|
| 1,002,851 | 9/1911 | Kullmer | 283/34 |
| 1,312,961 | 8/1919 | De Voe | 434/217 |
| 2,141,696 | 12/1938 | Rodd et al. | 434/217 X |
| 3,287,831 | 11/1966 | Holm | 434/150 |
| 4,289,333 | 9/1981 | Gaetano | 434/153 X |

*Primary Examiner*—William H. Grieb
*Attorney, Agent, or Firm*—Marmaduke A. Hobbs

[57] ABSTRACT

A method for plotting and disseminating information on the paths of violent storms, which can be used to accurately and quickly describe the affected region in a manner easily comprehended by the residents of the region. A map is provided with a grid system consisting of intersecting, generally vertical and horizontal columns and rows, dividing the area into subregions. Each row and each column has an identifying designation, and each subregion of the map has a distinct designation including the designations for the row and the column in which it is located. A weather bulletin for an area includes reference to the designations for the subregion involved.

6 Claims, 3 Drawing Figures

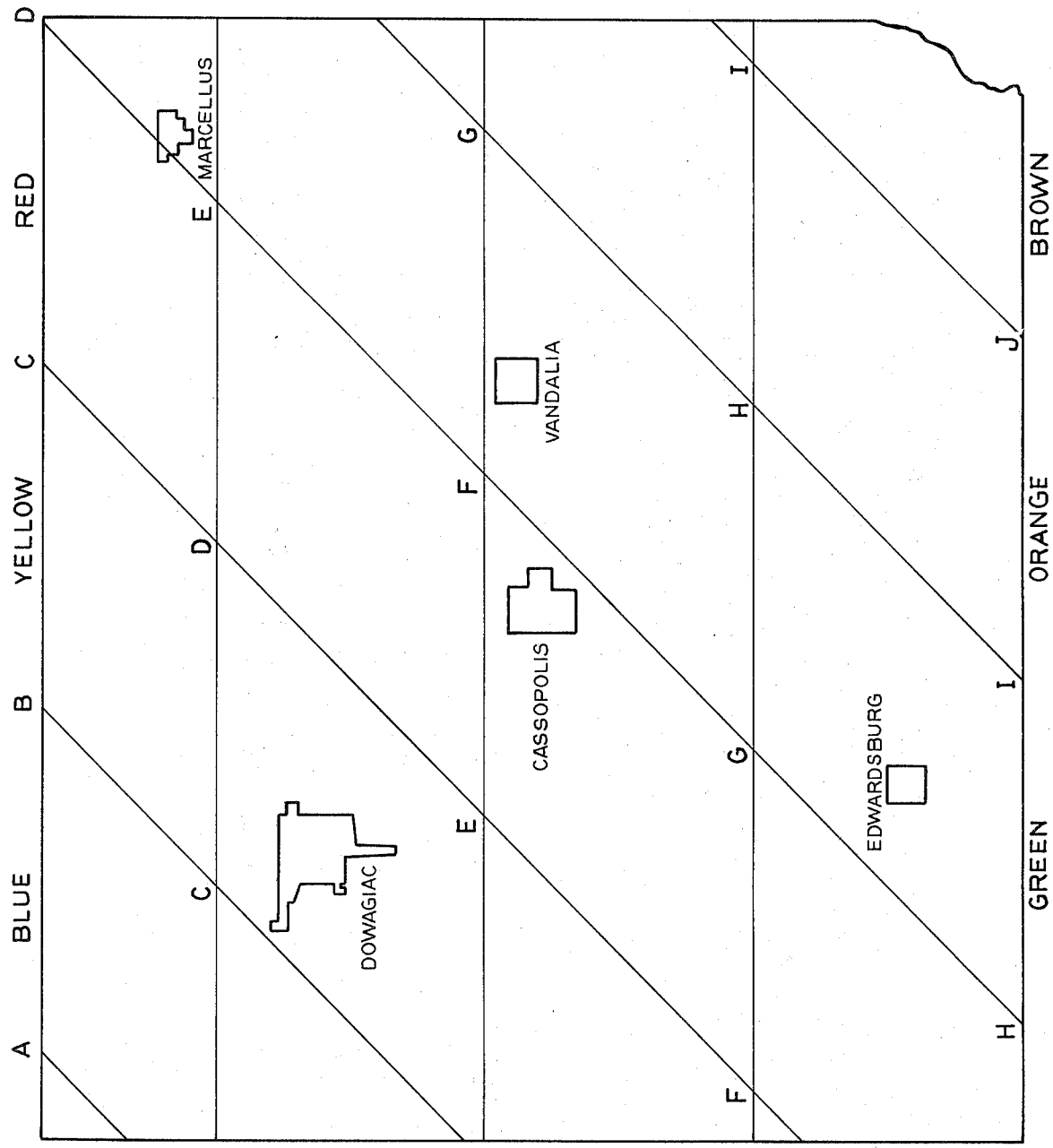

METHOD FOR PLOTTING AND DISSEMINATING INFORMATION ON THE PATHS OF VIOLENT STORMS

Each year violent storms, tornadoes and hurricanes cause tremendous amounts of property damage and loss of life. One of the most important factors in reducing the loss of life and property is early warning of the potential for violent storms, and the existence of damaging storm patterns, and the paths on which they are traveling. Early warning of the path of a tornado or other storm can eliminate loss of life by enabling people in the path of the tornado to flee from its path, or to take refuge in suitable tornado sheltering areas. The advanced equipment available, including orbiting weather satellites, for sensing the precursing meteorological conditions which can create a violent storm, and for determining the path which the storm will travel, enable meteorologists to accurately predict the potential for, and path of, violent storms, substantially in advance of the storms. Thus, if the information can be accurately transmitted to the general populace, property damage, and particularly the loss of lives, can be reduced. Various problems have arisen in accurately transmitting the meteorological information to the populace. In presently used methods, the National Weather Service issues bulletins which indicate that conditions are favorable for the formation of violent storms, and if a storm does form, the initial bulletin is followed with detailed information of the location and path of travel of the violent storm. The bulletins typically are transmitted on television and radio broadcasts, thereby notifying viewers and listeners of the weather conditions. Difficulties with the present warning system arise in accurately relaying the location of storms to the viewers. Locations are often described by defining imaginary lines between geological points, usually referenced by city locations, and describing the storm path or region in which violent storms could occur as being an area a certain distance on either side of the line. For example, a typical warning would state that violent storms could occur " . . . fifty miles on either side of a line extending from thirty miles south of city A to forty miles north of city B . . . ". While such a description is probably accurate in describing generally the location of the storm, it is normally quite difficult for a listener to quickly identify the area referred to. When several areas are described in a single weather bulletin, each being referenced to different primary lines, the confusion is even further increased. While persons living relatively close to the cities used as reference points for drawing the imaginary line may realize whether or not they are located in the described area, people living in areas between the two cities, especially if the cities are quite far apart, may have difficulty in ascertaining whether or not they are within the described area.

SUMMARY OF THE INVENTION

It is therefore one of the principal objects of the present invention to provide a system for accurately describing the area in which violent storms may arise and the path which they travel in a concise, readily understandable manner, and which can be used to accurately transmit the information in public broadcasts to the people to be warned.

Another object of the present invention is to provide a warning system for violent storms which can be used to describe large, broad areas in which storms may occur, and which can also be used to describe more definite and exact areas in which a tornado, for example, has been sighted and a path along which the tornado is moving.

These and other objects are achieved in the present invention by providing a grid-like pattern on a map of a given area, and identifying each of the grid sections with an appropriate designation different from that of the other sections on the map. In issuing a warning for the area in which violent storms may arise, or the path along which violent storms are progressing, the designations of the involved grid sections of the map are used to identify the area. The present method can be used for large areas, such as an entire state, and for smaller areas, such as a region of the state or counties in the state, and maps with grid designations can be used for cities and smaller regions as well.

In one suitable embodiment, the grid includes parallel lines across the map extending generally at the angle at which violent storms such as tornadoes usually travel. Normally these types of storms travel from a southwesterly direction to a northeasterly direction, and the lines hereinafter referred to as generally vertical are preferably disposed at a similar angle. Each of the regions defined by the generally vertical lines is designated with a number, letter, color or the like, or a combination of these designations. Cross lines extending east to west are provided as part of the grid to intersect the generally vertical lines and divide the map into subregions. The regions defined by the horizontal lines are also identified with a number, letter or other designation. Each subregion of the map defined by the lines of the grid has a separate and distinct identifying designation consisting of the designations of the row and column in which the subregion is located. A description for the path of a storm can be made by referring to the designations of the subregions involved. For example, a storm might be described as traveling from subregion A-4 to subregion C-6, and including the areas of subregions A-5, B-4, B-5, B-6 and C-5. Each resident will have been informed of the designation for his location previously, and will quickly learn whether or not he is included in the path being described for the storm.

Further objects and advantages of the present invention will become apparent from the detailed description and the accompanying drawings.

BRIEF DESCRIPTION OF THE DRAWINGS

FIG. 3 is a map similar to that of FIG. 2 with a similar grid system but having a modified means for identifying areas in the grid.

DETAILED DESCRIPTION OF THE PREFERRED EMBODIMENT

Figure 1:
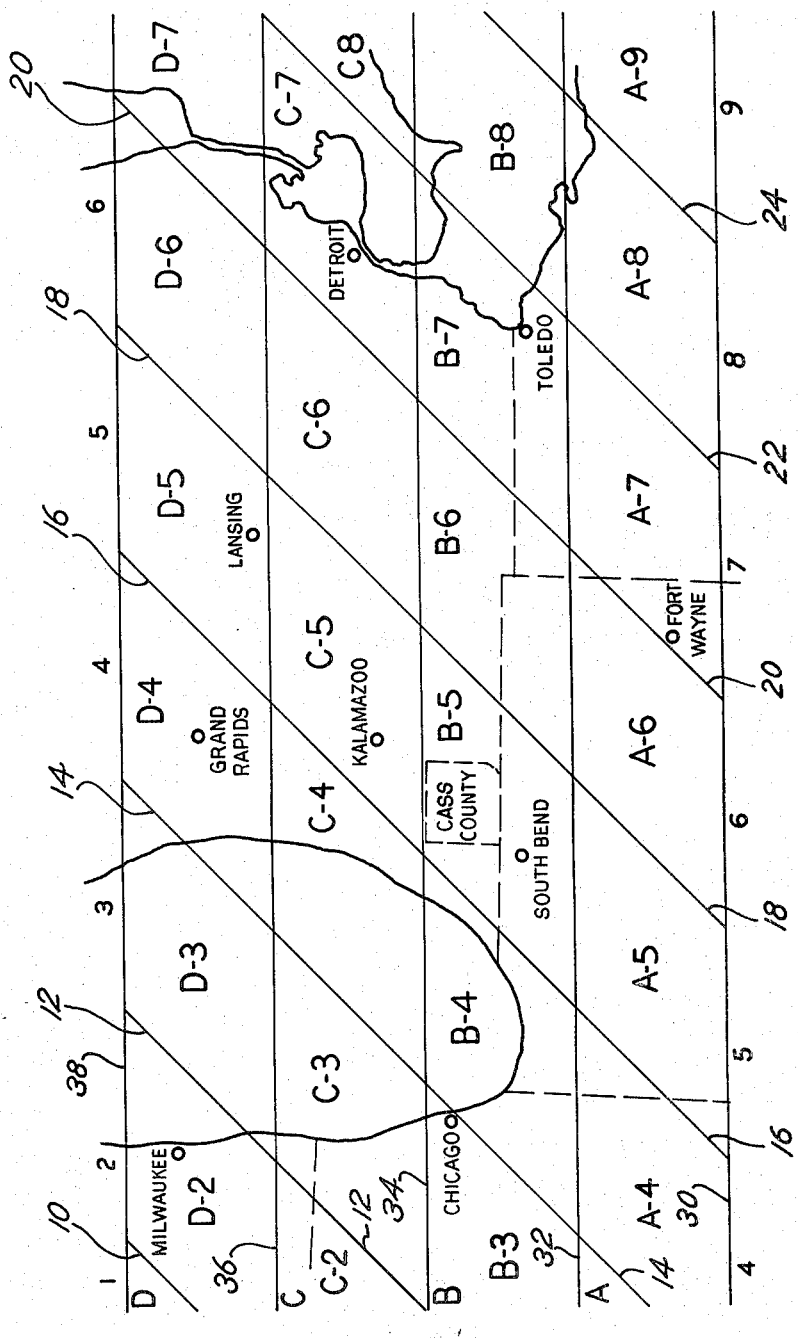
FIG. 1 is a map of a regional area of the United States, including portions of Wisconsin, Illinois, Indiana, Michigan and Ohio, which has been prepared with an appropriate grid for use in the present invention.

Referring now more specifically to the drawings, and to FIG. 1 in particular, a regional map of the United States is shown including an area surrounding a portion of Lake Michigan. The cities of Milwaukee, Wis.; Chicago, Ill.; South Bend and Fort Wayne, Ind.; Toledo, Ohio; and Grand Rapids, Kalamazoo, Lansing and Detroit, Mich., are shown on the map. A grid has been disposed on the map including generally vertical angular lines 10, 12, 14, 16, 18, 20, 22 and 24. The angular lines extend generally from a southwesterly direction to a northeasterly direction and should be disposed at about the angle at which violent storms generally travel in the region. The lines can be disposed on a north-south orientation; however, for ease in describing the path of a storm, the angular lines are preferred. Each of the "columns" defined by two of the angular lines is given an appropriate designation. For example, the angular columns in FIG. 1 have been provided with the designations 1, 2, 3, 4, 5, 6, 7, 8 and 9.

To further define the areas within the region, horizontal lines 30, 32, 34, 36 and 38 have been provided, extending across the map and intersecting angular lines 10 through 24. Each row defined by two of the horizontal lines is provided with an appropriate designation. In the embodiment shown in FIG. 1, the rows have been designated with the letters A, B, C and D. Hence, the map has been divided into smaller subregions defined by the grid, and each subregion has a different designation consisting of the letter and numeral identifying the row and column in which the subregion is located. Thus, South Bend, Ind., is located in subregion B5; Fort Wayne, Ind., is located in subregion A7; and Grand Rapids, Mich., is located in subregion D4.

Figure 2:
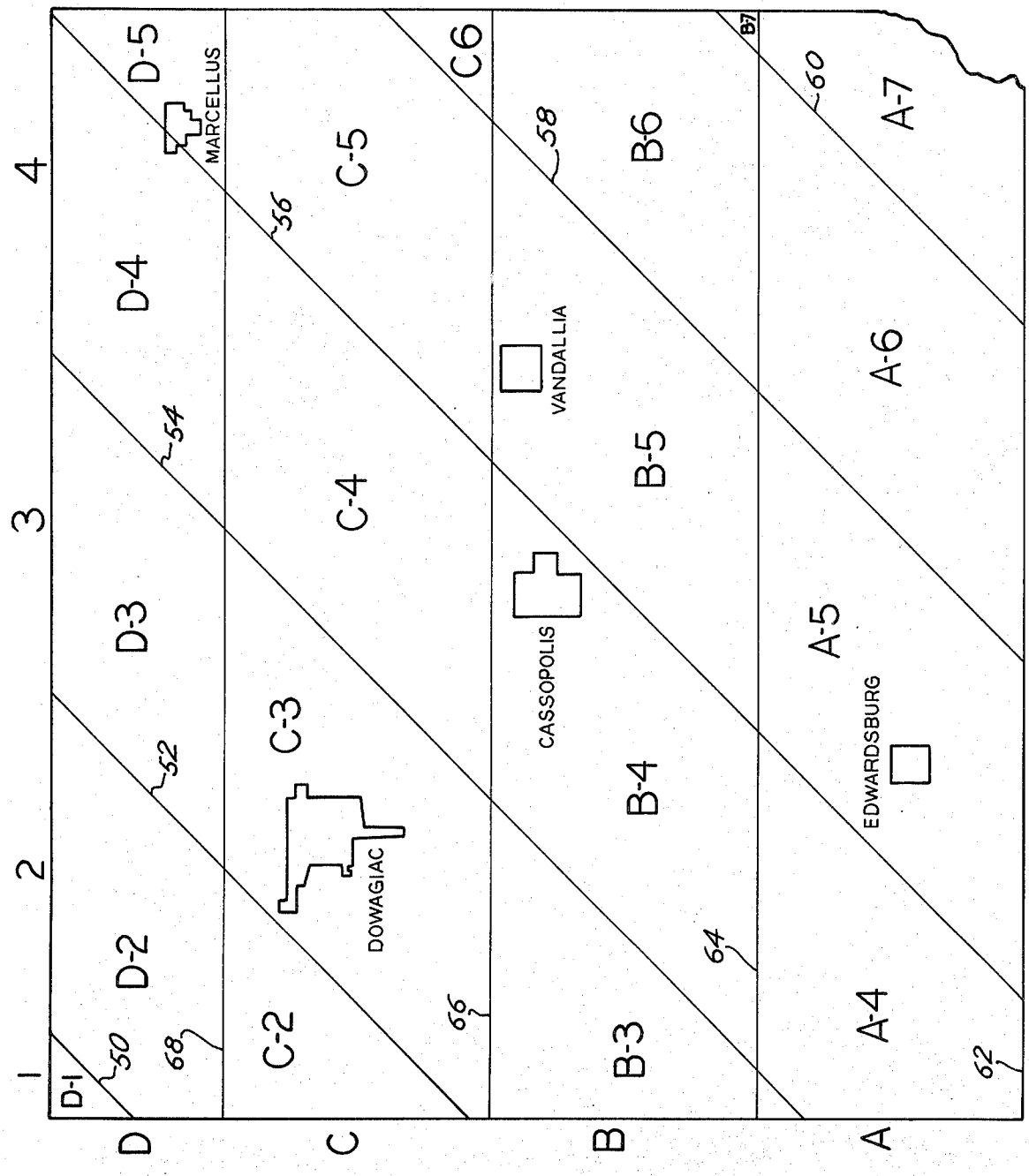
FIG. 2 is a map of a smaller area from FIG. 1, namely Cass County, Michigan, which is provided with an appropriate grid for use with the present warning system.

Cass County, Mich., is shown just north of South Bend in subregion B5 of FIG. 1. FIG. 2 is an enlarged view of Cass County, Mich., and a separate grid system has been superimposed on the county map. Hence, angular lines extending from a southwesterly point on the map to a northeasterly point have been provided, and have been designated with the numerals 50, 52, 54, 56, 58 and 60. The angular columns defined by the lines have been designated with numerals 1, 2, 3, 4, 5, 6 and 7. Horizontal lines 62, 64, 66 and 68 have been provided on the map, and the rows defined thereby are designated with the letters A, B, C and D. Thus, each of the sub-subregions defined by the lines of the grid has a numeral and letter designation. Dowagiac in Cass County, Mich., for example, is located in sub-subregion C3, and Edwardsburg is located in sub-subregion A5.

The size of the region on each map, and the spacing for the grid lines to determine the area in each subregion, can be varied in various regions of the United States, to best accommodate the size and type of storms most common in the region. It should be understood that other types of block designations can be used on the grid system, and the grid can be disposed at various different angles. FIG. 3 is a map similar to that shown in FIG. 2, having a grid system similar thereto, but having a different type of designation. Each of the angular columns is given a color. For example, blue, yellow, red, green, orange and brown may be used as indicated in FIG. 3, and each point of intersection between the horizontal lines and the angular lines has been designated with a letter. For convenience, the letters have been placed in alphabetical progression from left to right and top to bottom within the rows and columns, respectively. Reference to a particular subregion is made by citing the color and east-west lines defining it. Thus, Edwardsburg, Mich., can be described as being located in the green column between H-I and G-H, and Cassopolis, Mich., can be described as being in the red column between F-G and E-F.

It may be advantageous in some instances to provide a grid system such as that of FIG. 1 for maps of various regions of the United States, and then providing enlarged maps having grid systems for each of the subregions of the larger map. Hence, rather than providing an enlarged map having a grid system for Cass County, it may be preferable to provide an enlargement of the entire B5 block of FIG. 1. The system can then be used to define smaller and smaller areas in locating a storm or storm path. For example, the area surrounding Dowagiac, Mich., could be described as C3, B5, which would indicate sub-subregion C3 in subregion B5.

In carrying out the method embodying the present invention for plotting and describing the path of a violent storm, the earliest report, for example, may be that weather conditions in a general area are suitable for the formation of tornadoes. In this instance, the weather service would issue a bulletin stating that persons in various subregions should be aware of changing weather conditions and possible tornado formation. A severe thunderstorm warning might be issued for an even larger area including, for example, blocks B3, B4, B5, C3, C4 and C5. Residents will have been informed of their subregion designations previously, in a manner similar to the assignment of rural fire numbers. Those listening to a bulletin need only listen for their subregion designation to readily recognize whether or not they are in or near the area of a violent storm. If, for example, B5 has been indicated as one of the areas in which a thunderstorm may occur, those persons in subregion A5 would realize that they are on the fringe area of a storm, and would be alerted to the fact that if conditions changed and the path of the storm altered, they probably could be included in the storm area; however, a resident of subregion D2, for example, would realize that he is nowhere near the storm path and would be concerned only slightly with the bulletin.

If tornado watches or tornado warnings are issued, frequently the area will be more specifically defined than for a severe thunderstorm watch, and, if a severe thunderstorm does occur, there will generally be areas of more severe damage and wind velocity than other areas. When more well defined storm systems occur, a smaller map such as that of FIG. 2 might be used. Thus, if, for example, a funnel cloud were sighted near Edwardsburg, Mich., the weather report would relay the information that funnel clouds were sighted in subregion A5 of Cass County, and were moving in a northeasterly direction, including blocks B5, B6, C5 and C6. This would quickly inform the residents of those areas that tornadoes may be heading toward them, and the residents could take proper precautions for saving lives and property. Again, since each person would know his particular grid designation, he would readily know whether or not he was in danger from the violent storm. If the funnel cloud were sighted in subregion A5 and the warning included subregions B5, B6, C5 and C6, a resident of subregion A6 would realize that he is not included in the area but is very close thereto. Conversely, a resident of subregion D2 would realize that he is quite far removed from the path of the tornado, and probably will not be in any immediate danger.

The present method will substantially reduce the confusion presently encountered with descriptions of imaginary lines extending from various points near, or relative to, major cities. Since the same locations are not always used as the reference points, one does not become familiar with the areas and can be confused easily as to whether or not he is included in a particular warning. The present method would enable the National Weather Service or other warning agency to define a grid pattern and to use the same grid whenever storm warnings are issued. This would enable residents to become familiar with their location and designation, and would result in an immediate notification of the position and proximity of storms. Since the residents can be quickly and accurately warned, the loss of life and property can be substantially reduced when a defined system, readily recognizable by the residents, is used. Since many storms will follow the angular, generally vertical columns, a warning could be issued for all regions of one or more columns between various points. The residents will no longer have to visualize localities in their minds, but need only listen for the citation of their particular regional designation to know if they are included in a warning.

Although only one embodiment and several modifications of a method for plotting and describing the path of a violent storm have been shown and described in detail herein, various other changes may be made without departing from the scope of the present invention.

I claim:

1. A method for plotting and disseminating information on the paths of potentially dangerous meteorological conditions, including the steps of preparing a map of a given geographic region, superimposing on the map a grid system including generally horizontal lines and generally parallel, angular lines intersecting said generally horizontal lines and corresponding to the angle of the typical path of dangerous meteorological conditions in a selected region, dividing the map into subregions, identifying each subregion with a designation different from all other subregions of the map, plotting the location and path of a dangerous meteorological condition on the map, determining the subregions included therein, and announcing the existence and path of a said dangerous meteorological condition by identifying the subregions involved.

2. A method for plotting and disseminating information on the paths of potentially dangerous meteorological conditions as defined in claim 1 which further includes the steps of providing a designation for each column defined by said angular lines, providing a designation for each row defined by said generally horizontal lines, and designating each subregion with a symbol corresponding to the column and row of its location.

3. A method for plotting and disseminating information on the paths of potentially dangerous meteorological conditions as defined in claim 1, which further includes the steps of providing a numerical or letter designation for each column defined by said angular lines, providing a numerical or letter designation for each row defined by said generally horizontal lines, and designating each subregion with the numerical and/or letter designations corresponding to the column and row of its location.

4. A method for plotting and disseminating information on the paths of potentially dangerous meteorological conditions as defined in claim 1, which further includes the steps of coloring the areas between adjacent angular lines with different colors, providing each point of intersection between said angular and generally horizontal lines with a letter designation, and defining each subregion of the map by the color of its angular column and the letters defining the lines at the north and south ends of the subregion.

5. A method for plotting and disseminating information on the paths of potentially dangerous meteorological conditions as defined in claim 1, which further includes the steps of preparing maps of each of said subregions, dividing said maps of said subregions into sub-subregions by applying a grid system on each subregion map having generally horizontal and angular lines generally paralleling the respective lines of the regional grid, identifying each of said sub-subregions with a designation different from all other sub-subregions of said subregion, and plotting the path of a dangerous meteorological condition and announcing the sub-subregions in which the dangerous meteorological condition is located.

6. A method for plotting and disseminating information on the paths of potentially dangerous meteorological conditions as defined in claim 1 which further includes the step of coordinating identifying designations of subregions with designations of adjacent subregions.

* * * * *